(12) United States Patent
Patterson et al.

(10) Patent No.: US 7,775,050 B2
(45) Date of Patent: Aug. 17, 2010

(54) METHOD AND APPARATUS FOR REDUCING STRESSES INDUCED TO COMBUSTOR ASSEMBLIES

(75) Inventors: David Bruce Patterson, Mason, OH (US); Kelley Parker Brown, Cincinnati, OH (US); Robert Paul Czachor, Cincinnati, OH (US); Grzegorz Mlynski, Lomianki (PL)

(73) Assignee: General Electric Company, Schenectady, NY (US)

( * ) Notice: Subject to any disclaimer, the term of this patent is extended or adjusted under 35 U.S.C. 154(b) by 917 days.

(21) Appl. No.: 11/590,234

(22) Filed: Oct. 31, 2006

(65) Prior Publication Data

US 2008/0098739 A1 May 1, 2008

(51) Int. Cl.
*F02C 7/20* (2006.01)
(52) U.S. Cl. .............................. 60/796; 60/798; 60/800; 60/752; 60/39.37
(58) Field of Classification Search .................. 60/796, 60/798, 800, 752, 39.37
See application file for complete search history.

(56) References Cited

U.S. PATENT DOCUMENTS

| 4,413,477 | A |   | 11/1983 | Dean et al. |
|---|---|---|---|---|
| 5,154,060 | A |   | 10/1992 | Walker et al. |
| 5,634,767 | A |   | 6/1997 | Dawson |
| 6,668,559 | B2 |   | 12/2003 | Calvez et al. |
| 6,675,585 | B2 | * | 1/2004 | Calvez et al. ................. 60/796 |
| 6,705,087 | B1 |   | 3/2004 | Ohri et al. |
| 6,758,045 | B2 |   | 7/2004 | Dimov et al. |
| 6,775,985 | B2 |   | 8/2004 | Mitchell et al. |
| 2005/0000228 | A1 | * | 1/2005 | De Sousa et al. .............. 60/796 |

* cited by examiner

*Primary Examiner*—Michael Cuff
*Assistant Examiner*—Craig Kim
(74) *Attorney, Agent, or Firm*—William Scott Andes, Esq.; Armstrong Teasdale LLP

(57) ABSTRACT

A method for assembling a combustor for use in a turbine engine is provided. The method includes providing at least one support leg, forming at least one opening in the support leg, wherein the at least one opening has a perimeter defined only by a plurality of non-linear segments, and coupling the support leg to the combustor.

10 Claims, 6 Drawing Sheets

US 7,775,050 B2

METHOD AND APPARATUS FOR REDUCING STRESSES INDUCED TO COMBUSTOR ASSEMBLIES

BACKGROUND OF THE INVENTION

This invention relates generally to turbine engines, and more particularly, to a method and apparatus that facilitates reducing stress in combustor support legs used in turbine engines.

At least some known combustors are supported at an aft end of the combustor by support legs. Known support legs control the axial, radial and circumferential location of the combustor in a core gas turbine engine, and generally include a plurality of openings, called windows. Cooling fluid is channeled through such windows towards downstream components, such as turbine components. Generally, known windows are rectangular-shaped, square-shaped or elliptical-shaped.

Known rectangular-shaped and square-shaped windows include rounded corners that are each formed with the same radius, and that are connected together with straight line segments extending between adjacent corners. Known elliptical windows include two straight line segments that are substantially parallel to each other, and that are also connected at respective ends by arcuate segments having the same radii. Furthermore, known support legs also include bolt holes that are used to couple the support legs to a combustor casing at alternating window locations.

The rounded corners and/or sides of known window configurations may develop high concentrations of stress during turbine operations. Over time the stresses induced to the windows may cause cracking adjacent to the corners and may lead to failure of the support leg and/or reduce the on-wing service time of the support legs. As a result and based on the high failure frequency and potential, known support legs are generally replaced more frequently, thereby increasing engine downtime and increasing maintenance costs.

BRIEF DESCRIPTION OF THE INVENTION

In one aspect, a method for assembling a combustor for use in a turbine engine is provided. The method includes providing at least one support leg, forming at least one opening in the support leg, wherein the at least one opening has a perimeter defined only by a plurality of non-linear segments, and coupling the support leg to the combustor.

In another aspect, a support leg for use with a turbine engine combustor is provided. The support leg includes a window portion including at least one window including a perimeter defined only by a plurality of non-linear segments, and a coupling portion configured to couple to an aft end of the combustor such that the support leg supports the combustor within the turbine engine.

In yet another aspect, a support system for locating a combustor in a turbine engine is provided. The support system includes a support leg, the support leg includes a liner coupling portion, and a window portion including at least one window. The at least one window includes a perimeter only defined by a plurality of non-linear segments. The support system also includes a coupling portion configured to couple to an aft end of the combustor such that the support leg supports the combustor within the turbine engine.

DETAILED DESCRIPTION OF THE INVENTION

Figure 1:
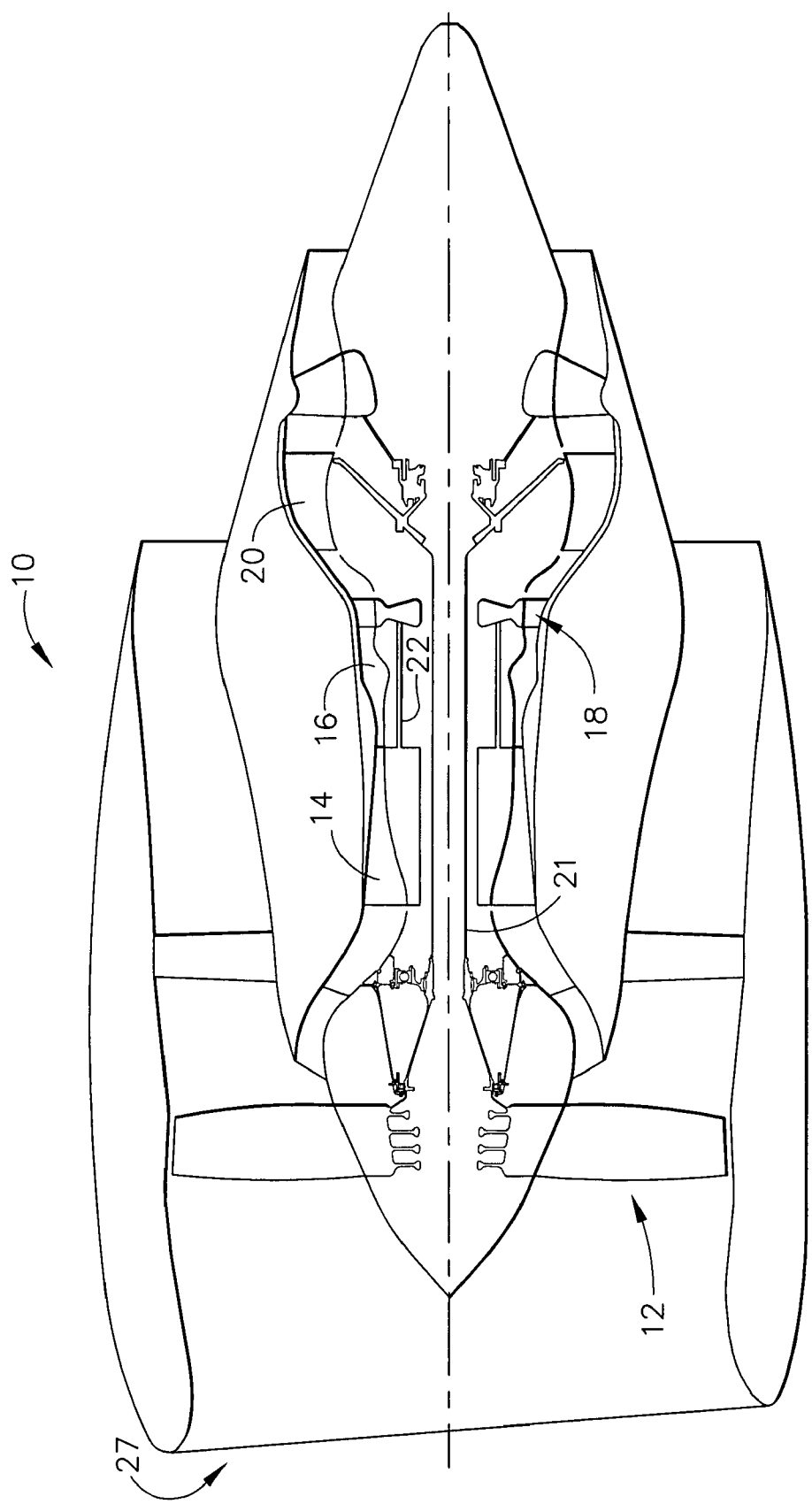
FIG. 1 is a schematic illustration of an exemplary turbofan gas turbine assembly.

FIG. 1 is a cross-sectional view of a portion of an exemplary turbofan engine assembly 10 having a longitudinal axis 11. In the exemplary embodiment, turbofan engine assembly 10 includes a core gas turbine engine 12 that includes a high-pressure compressor 14, a combustor 16, and a high-pressure turbine 18. Turbofan engine assembly 10 also includes a low-pressure turbine 20 that is disposed axially downstream from core gas turbine engine 12, and a fan assembly 22 that is disposed axially upstream from core gas turbine engine 12.

Figure 2:
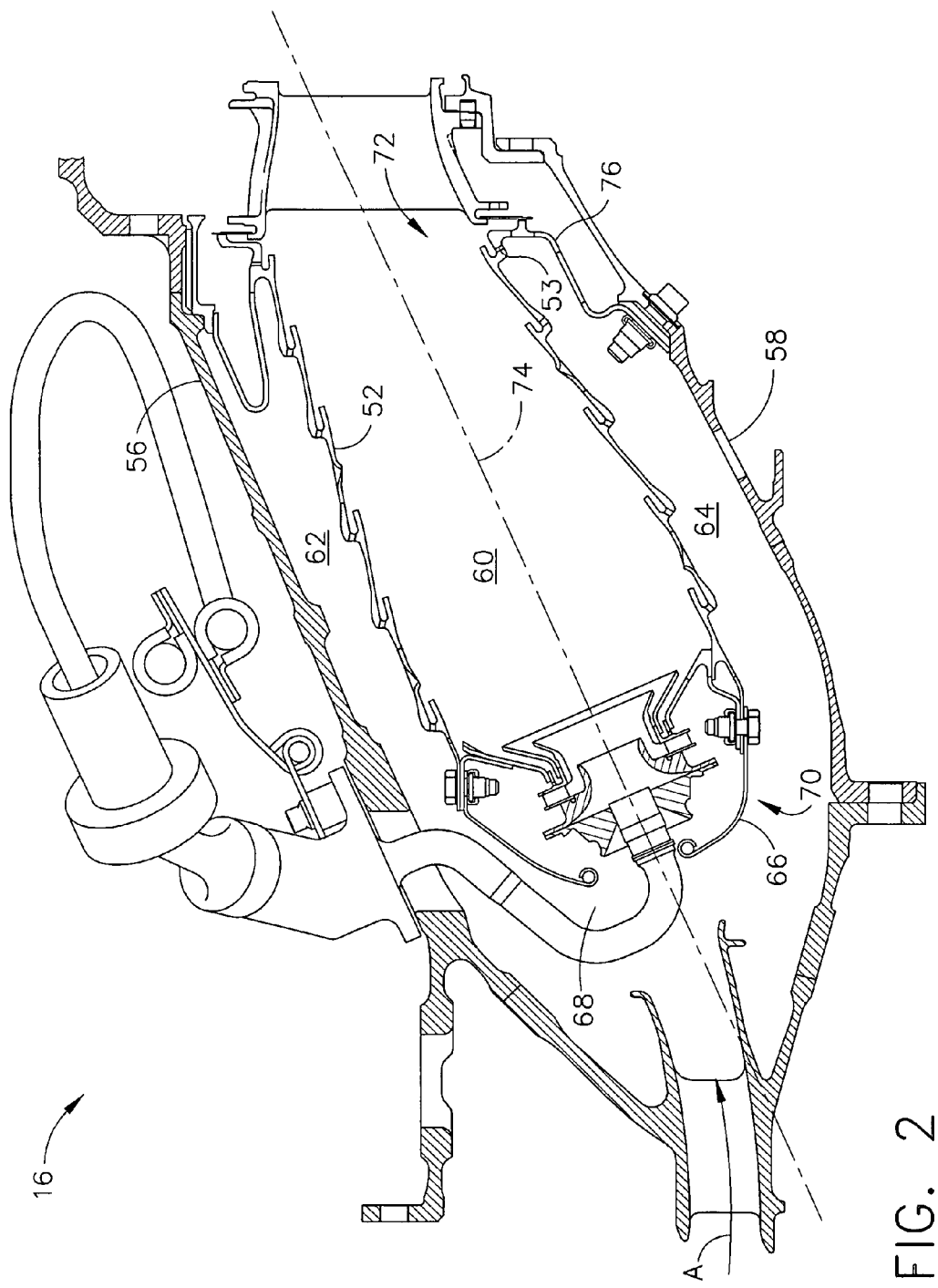
FIG. 2 is a schematic cross-sectional view of an exemplary combustor that may be used with the turbofan gas turbine assembly shown in FIG. 1.

FIG. 2 is a schematic cross-sectional view of an exemplary combustor 16 that may be used with core gas turbine engine 12 (shown in FIG. 1). Combustor 16 includes an outer liner 52 and an inner liner 54 disposed between an outer combustor casing 56 and an inner combustor casing 58. Outer and inner liners 52 and 54 are spaced radially from each other such that a combustion chamber 60 is defined therebetween. Outer liner 52 and outer casing 56 form an outer passage 62 therebetween, and inner liner 54 and inner casing 58 form an inner passage 64 therebetween. A cowl assembly 66 is coupled to the upstream ends of outer and inner liners 52 and 54, respectively. An annular opening 68 leading to an opening formed in cowl assembly 66 enables compressed fluid to enter combustor 16 in a direction generally indicated by arrow A. It should be appreciated that the term "fluid" as used herein includes any material or medium that flows, including but not limited to, gas and air. The compressed fluid flows through annular opening 68 to support combustion and to facilitate cooling liners 52 and 54.

Combustor 16 includes a longitudinal axis 74 which extends from a forward end 70 to an aft end 72 of combustor 16. In the exemplary embodiment, combustor 16 is a single annular combustor. Alternatively, combustor 16 may be any other combustor, including, but not limited to a double annular combustor. An aft end 53 of inner liner 54 is coupled to and held in position by an exemplary support leg 76. Support leg 76 is also coupled to inner combustor casing 58.

Figure 3:
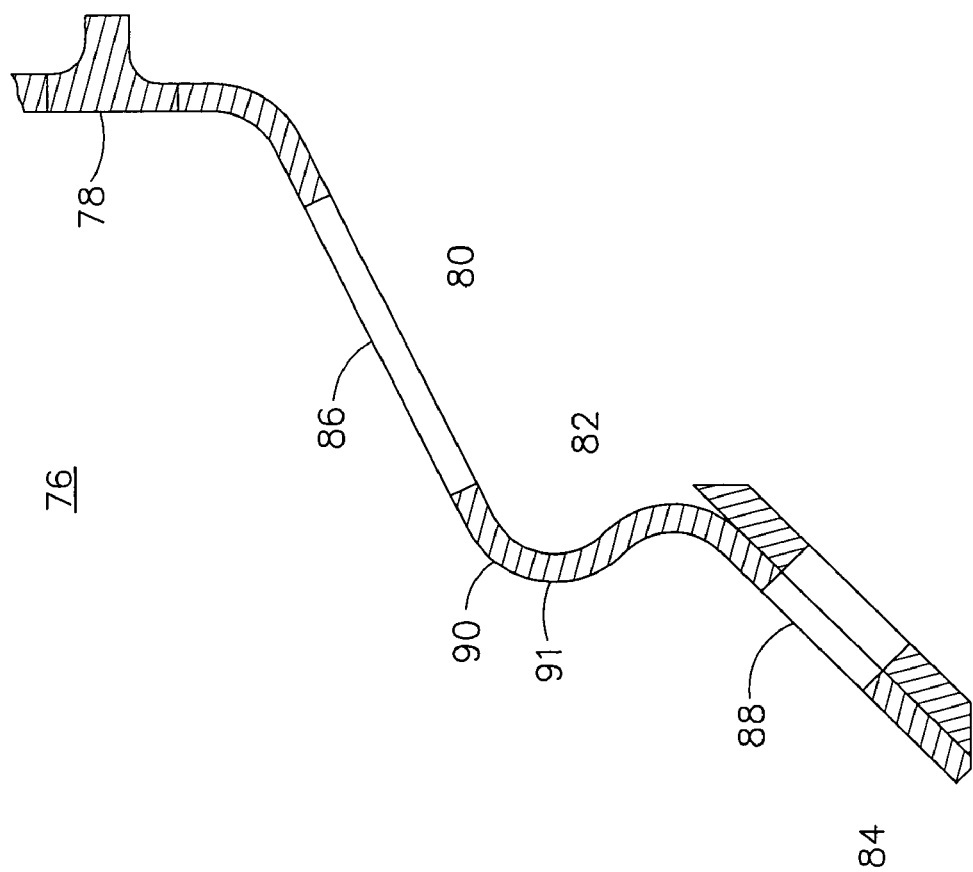
FIG. 3 is an enlarged cross-sectional view of an exemplary support leg.

FIG. 3 is an enlarged cross-sectional view of support leg 76. In the exemplary embodiment, support leg 76 includes a liner coupling portion 78, a window portion 80, a knuckle portion 82 and a casing coupling portion 84. Liner coupling portion 78 is configured to couple to inner liner aft end 53 (shown in FIG. 1) Window portion 80 is formed with an opening or window 86, that is sized and shaped to facilitate channeling cooling fluid from inner passage 64 (shown in FIG. 2) towards downstream turbine components 18 and 20 (shown in FIG. 2). In the exemplary embodiment, knuckle portion 82 is S-shaped and includes a bend 90 that defines a forward-most point 91. Casing coupling portion 84 includes at least one opening 88 that is sized and shaped to receive a fastener therethrough to couple leg 76 to inner combustor casing 58. Specifically, a bolt (not shown) is inserted through opening 88 to secure support leg 76 to inner combustor casing 58. In the exemplary embodiment, support leg 76 is fabricated from a material, such as HS188 that enables leg 76 to withstand operating stresses and that facilitates increasing on-wing service time of support leg 76. However, it should be appreciated that other embodiments may use any material that enables support leg 76 to function as described herein.

Modifying the outer perimeter and/or geometry of known windows facilitates changing the interaction between the window border edges and stress fields 87 that may develop about the windows. Consequently, the exemplary embodiments described herein modify known window configurations to facilitate reducing stress field interruption about window perimeters.

Figure 4:
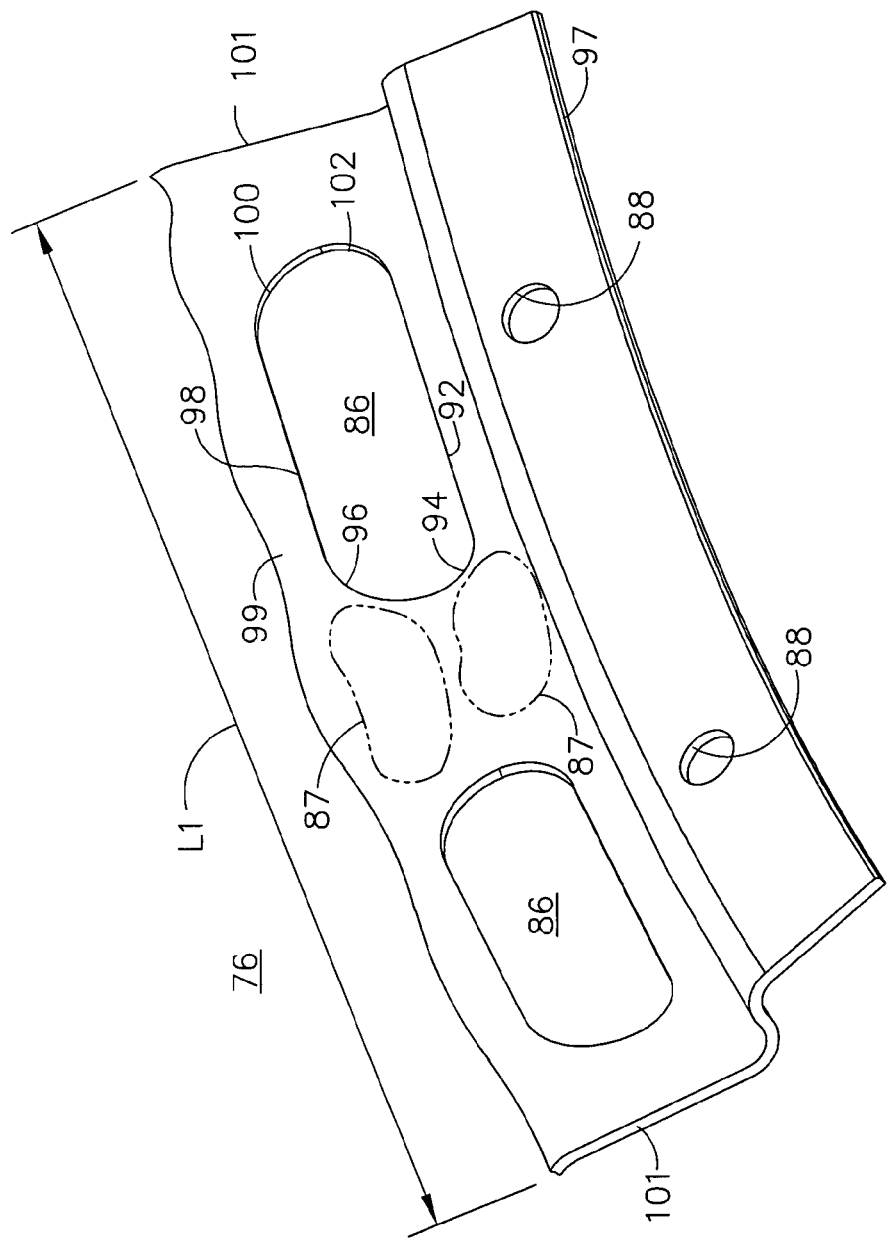
FIG. 4 is a perspective view of a segment of the support leg shown in FIG. 3.

FIG. 4 is a perspective view of a segment of support leg 76. In the exemplary embodiment, windows 86 are each defined by a first arcuate segment 92, a second arcuate segment 94, a third arcuate segment 96, a fourth arcuate segment 98, a fifth arcuate segment 100 and a sixth arcuate 102. Each arcuate segment 92, 94, 96, 98, 100 and 102 is defined by a radius. As such, window 86 is defined only by curved segments. More specifically, in the exemplary embodiment, windows 86 are defined only by non-linear segments. Because windows 86 are defined with only arcuate segments, windows 86 are shaped in a configuration that facilitates minimally interrupting a stress field 87 that may be induced to leg 76. The curved window configuration also facilitates reducing stress development along the perimeter of window 86 as defined by arcs 92, 94, 96, 98, 100 and 102 and along the areas surrounding each window 86.

Support leg 76 extends between a radially inner edge 97 and a radially outer edge 99. In the exemplary embodiment, support leg 76 has an annular configuration and circumscribes aft end 72 of combustor 16. More specifically, support leg 76 is coupled to inner liner aft end 53 such that aft end 53 circumscribes support leg 76. It should be understood that support leg 76 includes twenty windows 86 circumferentially and uniformly spaced about the perimeter of support leg 76. However, it should be appreciated that although the exemplary embodiment is described as including twenty windows 86 uniformly spaced about support leg 76, other embodiments may include any number of windows 86 spaced in any manner, that enable support leg 76 to function as described herein. Moreover, it should be appreciated that the size, dimensions, and shape of windows 86 is variably selected depending on the area required to provide adequate cooling flow therethrough to downstream components.

Figure 5:
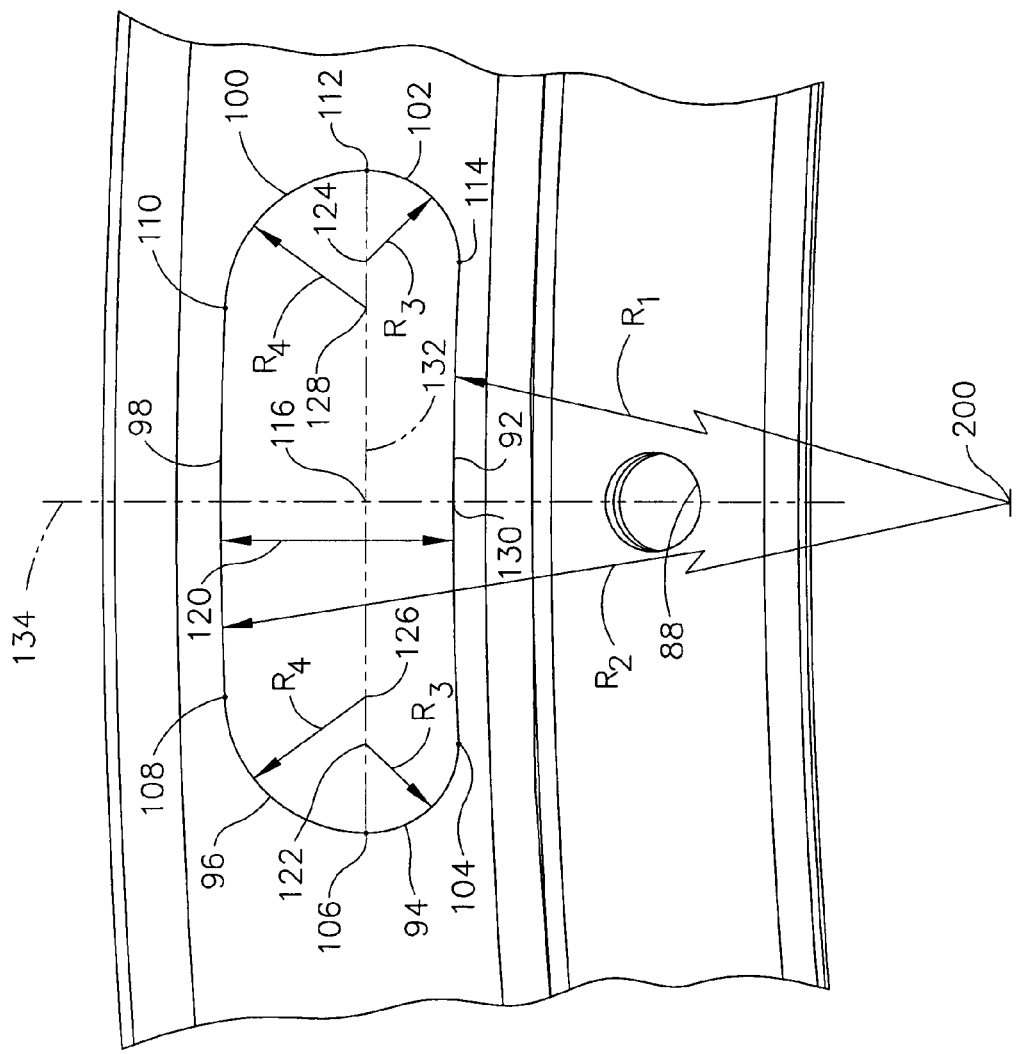
FIG. 5 is an enlarged view of a portion of the support leg shown in FIG. 4.

FIG. 5 is an enlarged view of an exemplary window 86. In the exemplary embodiment, arcuate segments 92 and 98 each have radii $R_1$ and $R_2$, respectively. It should be understood that radii $R_1$ and $R_2$ are measured from the same center point 200 and that radius $R_2$ is longer than radius $R_1$. In the exemplary embodiment, the difference between radii $R_1$ and $R_2$ defines a width 120 of each window 86. Arcuate segments 94 and 102 are each defined by a radius $R_3$, and arcuate segments 96 and 100 are each defined by a radius $R_4$. Arcuate segments 94 and 102 are each defined with respect to a center point, 122 and 124, respectively. Arcuate segments 96 and 100 are each defined with respect to a center point 126 and 128, respectively. It should also be understood that in the exemplary embodiment, radii $R_3$ and $R_4$ are different and are selected to facilitate reducing stresses along the perimeter of window 86.

In the exemplary embodiment, arcuate segment 92 extends from arcuate segment 102 to arcuate segment 94. More specifically, arcs 92 and 94 have a common tangent, a compound curvature point 104 which forms a smooth transition between arcs 92 and 94. Arc 94 extends from arcuate segment 92 to arc 96. Specifically, arcuate segments 94 and 96 have a common tangent at a compound curvature point 106 which defines a smooth transition point between arcs 94 and 96. Arcuate segment 96 extends from arcuate segment 94 to arc 98. Arcuate segments 96 and 98 have a common tangent at a compound curvature point 108 which defines a smooth transition point between arcs 96 and 98. Arc 98 extends from arcuate segment 96 to arcuate segment 100. Arcuate segments 98 and 100 have a common tangent at a compound curvature point 110 which defines a smooth transition point between arcuate segments 98 and 100. Arcuate segment 100 extends from arcuate segment 98 to arcuate segment 102. Arcuate segments 100 and 102 have a common tangent at a compound curvature point 112 which defines a smooth transition point between arcs 100 and 102. Arc 102 extends from arcuate segment 100 to arc 92. Arcs 102 and 92 have a common tangent at a compound curvature point 114 which defines a smooth transition point between arcs 102 and 92. The window configuration described herein defines a window 86 that is shaped to facilitate reducing stress induced to support leg 76 because the shape defined by the arcuate segments 92, 94, 96, 98, 100 and 102 minimally interrupts the stress fields 87 that may develop around window 86.

In the exemplary embodiment, each window 86 has an arcuate centerline 132 extending from point 106 to point 112. Fastener openings 88 are defined along center line 134 such that each opening 88 is substantially concentrically aligned with a midpoint 116 of each window centerline 132. More specifically, in the exemplary embodiment, each opening 88 is a distance $D_2$ from each window centerline 132 such that openings 88 are circumferentially aligned with each other. Openings 88 facilitate reducing stresses about the perimeter of window 86. It should be appreciated that although the exemplary embodiment is described using substantially circular openings 88, in other embodiments openings 88 may have any size and/or shape that enables support leg 76 to function as described herein.

Figure 6:
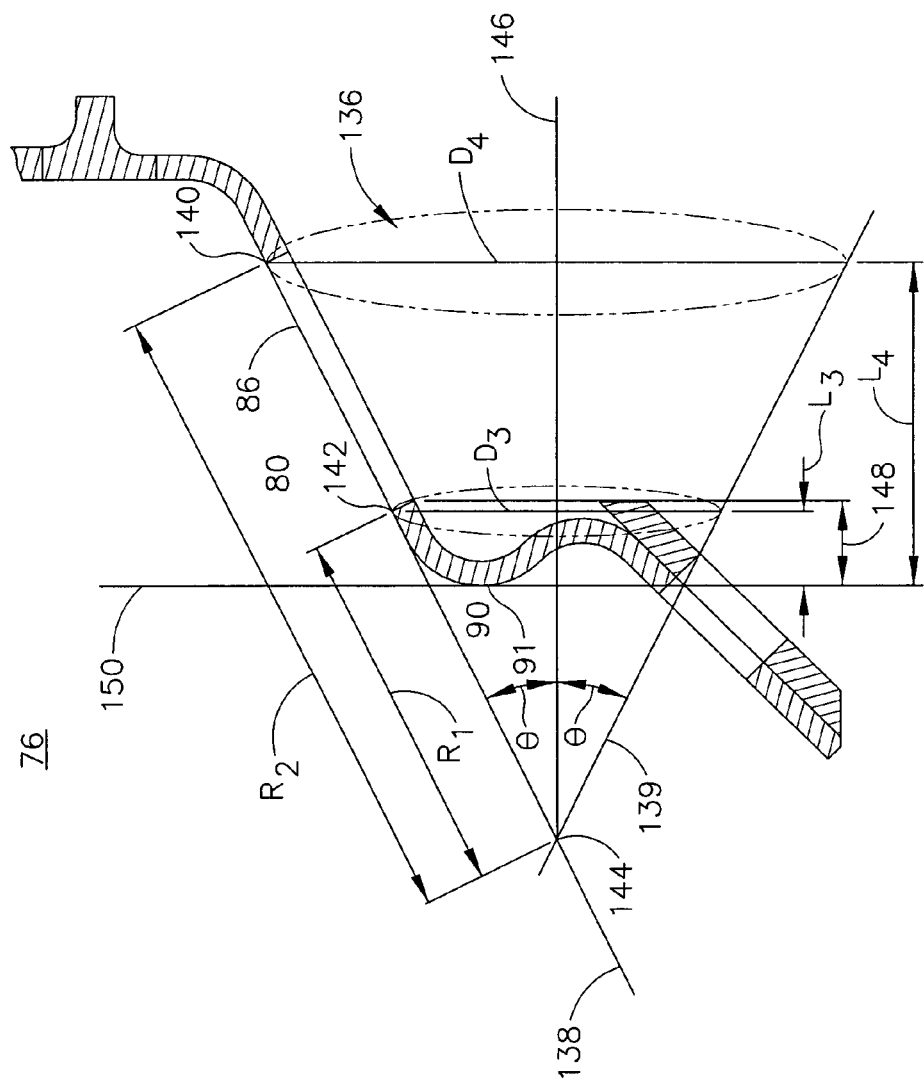
FIG. 6 is an enlarged cross-sectional view of the support leg shown in FIG. 3 and including an exemplary diagram for locating the window shown in FIGS. 4 and 5.

FIG. 6 is an enlarged cross-sectional view of support leg 76 and illustrates an exemplary diagram for locating each window 86. In the exemplary embodiment, each window 86 is initially defined by using the slope of each support leg window portion 80 to generate a conical shape 136. More specifically, initially the slope of window portion 80 is extended to define a line 138. A horizontal line 146 is then generated to extend through a center of the conical shape 136 generated. Line 146 intersects line 138 at a point 144 such that an angle θ is defined between lines 138 and 146. At forward-most point 91 of bend 90, a substantially vertical line 150 is defined tangentially to point 91 such that line 150 is substantially perpendicular to line 146. Then, a location 140 is determined on window portion 80 at a distance $L_4$ from line 150. The location 140 is based on adjacent geometry, part specific conditions and empirical data. A line $D_4$ is extended through location 140 such that line $D_4$ is substantially perpendicular to line 146.

A vertical line $D_3$ is then extended through a location 142. Location 142 is a distance $L_3$ from line 150. Specifically, line $D_3$ is extended through location 142 such that line $D_3$ is substantially perpendicular to line 146. A line 139 is then constructed along the opposite slope of the conical shape 136 generated. Accordingly, lines 138, 139, and $D_4$ define conical shape 136. Next, the angle θ measured between lines 146 and 138 is determined using the formula $\theta=\tan^{-1}(((D_4/2)-(D_3/2))/(L_4-L_3))$. After determining angle θ, radius $R_2$ is computed using the formula $R_2=D_4/2 \cos \theta$, and radius $R_1$ is computed using the formula $R_1=D_3/2 \cos \theta$. Thus, the lengths of radii $R_1$ and $R_2$ depend on cone diameters $D_3$ and $D_4$, and angle θ. In the exemplary embodiment, angle θ is approximately 26.246 degrees. However, it should be appreciated that in other embodiments, any angle θ may be selected that enables support leg 76 to function as described herein.

In the exemplary embodiment, radii $R_1$, $R_2$, $R_3$ and $R_4$ are each a different length. Specifically, in the exemplary embodiment, radius $R_1$ is approximately 24.55 inches, radius $R_2$ is approximately 25.21 inches, radius $R_3$ is approximately 0.25 inches, and radius $R_4$ is approximately 0.45 inches. It should be appreciated that other embodiments, radii $R_1$, $R_2$, $R_3$ and $R_4$ may be any length that enables support leg 76 to function as described herein. Moreover, it should be appreciated that although the exemplary embodiment includes four curves, other embodiments may use any number of non-linear segments to define the perimeter of window 86 that enable support leg 76 to function as described herein. It should also be understood that the dimensions described herein have a tolerance of ±0.010 inches.

In each embodiment the above-described support leg windows facilitate reducing stresses induced to the support leg about each window's perimeter and thus facilitate improving the durability and useful life of each support leg. More specifically, in each embodiment, the support leg windows facilitate reducing stresses induced to each support leg by shaping each window to avoid stress fields 87 that may be generated. As a result, the windows facilitate performing less support leg 76 maintenance within a corresponding turbine engine. Accordingly, core gas turbine engine performance and component useful life are each facilitated to be enhanced in a cost effective and reliable means.

Although the apparatus and methods described herein are described in the context of positioning windows in a combustor liner support leg of a core gas turbine engine, it should be understood that the apparatus and methods are not limited to core gas turbine engines, combustor liners, or windows. Likewise, the core gas turbine engine and support leg illustrated are not limited to the specific embodiments described herein, but rather, components of both the core gas turbine engine and the support leg can be utilized independently and separately from other components described herein.

While the invention has been described in terms of various specific embodiments, those skilled in the art will recognize that the invention can be practiced with modification within the spirit and scope of the claims.

What is claimed is:

1. A method for assembling a combustor for use in a turbine engine, said method comprising:
   providing a support leg;
   forming a cooling opening in the support leg, wherein the cooling opening has a first arcuate end and a second arcuate end opposite the first arcuate end, the first arcuate end including a first segment having a first radius and a second segment having a second radius different than the first radius, the second arcuate end including a third segment having a third radius and a fourth segment having a fourth radius different than the third radius; and
   coupling the support leg to the combustor.

2. A method in accordance with claim 1 further comprising forming the cooling opening such that the first radius, the second radius, the third radius, and the fourth radius are different.

3. A method in accordance with claim 1 further comprising forming at least one of the third radius and the fourth radius to be different than at least one of the first radius and the second radius.

4. A method in accordance with claim 1 further comprising positioning a fastener opening adjacent to the cooling opening and centrally between the first arcuate end and the second arcuate end.

5. A support leg for a combustor of a turbine engine, the combustor including a forward end and an aft end, said support leg comprising:
   a first portion comprising a cooling opening comprising a first arcuate end and a second arcuate end opposite said first arcuate end, said first arcuate end comprising a first segment having a first radius and a second segment having a second radius different than the first radius, said second arcuate end comprising a third segment having a third radius and a fourth segment having a fourth radius different than the third radius; and
   a second portion extending from said first portion, said second portion configured for coupling said support leg to the aft end of the combustor such that said support leg supports the combustor within the turbine engine.

6. A support leg in accordance with claim 5 wherein said second portion comprises a fastener opening positioned adjacent to said cooling opening and centrally between said first arcuate end and said second arcuate end.

7. A support leg in accordance with claim 5 wherein the first radius, the second radius, the third radius, and the fourth radius are different.

8. A turbine engine comprising:
   a combustor: and
   a support leg coupled to said combustor, said support leg comprising a cooling opening comprising a first arcuate end and a second arcuate end opposite said first arcuate end, said first arcuate end comprising a first segment having a first radius and a second segment having a second radius different than the first radius, said second arcuate end comprising a third segment having a third radius and a fourth segment having a fourth radius different than the third radius.

9. A turbine engine in accordance with claim 8 wherein said support leg further comprises at least one fastener opening positioned adjacent to said cooling opening and substantially centered between said first arcuate end and said second arcuate end.

10. A turbine engine in accordance with claim 8 wherein the first radius, the second radius, the third radius, and the fourth radius are different.

* * * * *